United States Patent
Doherty et al.

(10) Patent No.: US 6,879,083 B2
(45) Date of Patent: Apr. 12, 2005

(54) GENERATOR ROTOR COIL END-TURN RETENTION SYSTEM AND METHOD

(75) Inventors: Kieran Doherty, Oro Valley, AZ (US); William M. Scherzinger, Tucson, AZ (US); David E. Stout, Tucson, AZ (US); Simon L. Waddell, Tucson, AZ (US); Shannon W. Rogers, Alpharetta, GA (US); James Ritter, Colts Neck, NJ (US); Henry Pszczola, deceased, late of Lakehurst, NJ (US); by Shirley Pszczola, legal representative, Lakehurst, NJ (US)

(73) Assignee: Honeywell International Inc., Morristown, NJ (US)

( * ) Notice: Subject to any disclaimer, the term of this patent is extended or adjusted under 35 U.S.C. 154(b) by 21 days.

(21) Appl. No.: 10/633,282

(22) Filed: Jul. 31, 2003

(65) Prior Publication Data

US 2005/0023928 A1 Feb. 3, 2005

(51) Int. Cl.⁷ .................................................. H02K 3/46
(52) U.S. Cl. ....................................................... 310/270
(58) Field of Search ................................ 310/260, 270, 310/271; 29/598

(56) References Cited

U.S. PATENT DOCUMENTS

| | | |
|---|---|---|
| 3,151,260 A | 9/1964 | MacCracken, Jr. ........... 310/43 |
| 4,091,301 A | 5/1978 | Blank .......................... 310/270 |
| 4,146,858 A | 3/1979 | McDermott ................... 336/90 |
| 4,443,722 A | 4/1984 | Hirao et al. ................... 310/45 |
| 4,467,234 A | 8/1984 | Tahara et al. ................ 310/195 |
| 4,710,662 A | 12/1987 | Balke et al. ................. 310/204 |
| 4,808,873 A | 2/1989 | Rowe et al. ................. 310/260 |
| 4,967,465 A * | 11/1990 | Frank .......................... 29/598 |
| 5,142,182 A | 8/1992 | Grant ......................... 310/270 |
| 5,216,309 A | 6/1993 | Balke et al. ................. 310/233 |
| 5,528,097 A * | 6/1996 | Gardner et al. ............. 310/270 |
| 5,729,068 A | 3/1998 | Gasparini et al. ........... 310/179 |
| 5,900,689 A | 5/1999 | Heil et al. ................... 310/271 |
| 6,218,759 B1 * | 4/2001 | Blakelock et al. .......... 310/254 |

* cited by examiner

*Primary Examiner*—Dang Le
(74) *Attorney, Agent, or Firm*—Douglas A. Mullen, Esq.

(57) ABSTRACT

The coil end-turn segments of a generator exciter rotor are retained using an end-turn retention assembly that includes an inner band and an outer band. The inner band is located around at least a portion of each of the end-turn segments and has two ends. The outer peripheral surface of the inner band is tapered such that the thickness of the inner band varies between its ends. The outer band is located around the inner band and also has two ends. The inner peripheral surface of the outer band is tapered in a fashion that is reverse to that of the inner band outer surface, and such that the outer band thickness varies between its ends. By forming oppositely configured tapers in the inner and outer bands, the outer bands will remain in place and not migrate axially away from the lamination core during exciter rotor rotation.

28 Claims, 7 Drawing Sheets

GENERATOR ROTOR COIL END-TURN RETENTION SYSTEM AND METHOD

This invention was made with Government support under DTFR53-99-H-0006 awarded by Federal Railroad Administration. The Government has certain rights in this invention.

FIELD OF THE INVENTION

The present invention relates to high speed generators and, more particularly, to a system and method for retaining the coil end-turn segments in high speed generators.

BACKGROUND OF THE INVENTION

A generator system for a gas turbine engine, such as that found in aircraft, ships, and some terrestrial vehicles, may include three separate brushless generators, namely, a permanent magnet generator (PMG), an exciter, and a main generator. The PMG includes permanent magnets on its rotor. When the PMG rotates, AC currents are induced in stator windings of the PMG. These AC currents are typically fed to a regulator or a generator control device, which in turn outputs a DC current. This DC current next is provided to stator windings of the exciter. As the rotor of the exciter rotates, three phases of AC current are typically induced in the rotor windings. Rectifier circuits that rotate with the rotor of the exciter rectify this three-phase AC current, and the resulting DC currents are provided to the rotor windings of the main generator. Finally, as the rotor of the main generator rotates, three phases of AC current are typically induced in its stator, and this three-phase AC output can then be provided to a load such as, for example, an aircraft, ship, or vehicle electrical system.

Because some generator applications are high speed generators with potential rotational speeds up to and in excess of 24,000 rpm, potentially large centrifugal forces may be imposed upon the rotors in generators. Given these potentially stressful operating conditions, the rotors should be carefully designed and manufactured, so that the rotors are reliable and precisely balanced. Improper balancing not only can result in inefficiencies in the operation of a generator, but may also affect the reliability of the generator.

Among the components of a rotor that provide increased reliability and proper balancing of the rotors are the wire coils wound on the rotor. The centrifugal forces experienced by a rotor may be strong enough to cause bending of the wires of these coils. Over time, such bending can result in mechanical breakdown of the wires and compromise of the coil insulation system. Additionally, because the coils are assemblies of individual wires that can move to some extent with respect to one another and with respect to the remaining portions of the rotors, the coils are a potential source of imbalance within the rotor and can potentially compromise the insulation system. Even asymmetrical movements of these coils on the order of only a few thousandths of an inch can, in some instances, be significant.

Hence, there is a need for a system and method for retaining the coils in the rotors of a high speed generator during generator operation. The present invention addresses one or more of these needs.

SUMMARY OF THE INVENTION

The present invention provides a system and method for retaining the coils in the rotors of a high speed generator during generator operation.

In one embodiment, and by way of example only, a generator includes a stator and a rotor. The rotor is rotationally mounted at least partially within the stator and includes a winding support, a lamination core, a first inner band, and a first outer band. The lamination core is mounted on the winding support and has a plurality of slots formed therein. One or more coils are inserted within each of the slots. Each coil has at least one end-turn segment protruding from the slot and extending away from the lamination core. The first inner band is located around at least a portion of each of the end-turn segments, and has at least a near end, a distal end disposed opposite the near end, and a thickness. The near end is located proximate the lamination core, and the thickness of at least a portion of the first inner band decreases from at least a point proximate the distal end to at least a point between its distal end and its near end. The first outer band is located around at least a portion of the first inner band, and has at least a near end, a distal end disposed opposite the near end, and a thickness. The first outer band near end is located proximate the first inner band near end, and the thickness of at least a portion of the first outer band increases from at least a point proximate its distal end to at least a point between its distal end and its near end.

In another exemplary embodiment, a rotor assembly for a generator includes a winding support, a lamination core, one or more coils, a first inner band, and as first outer band. The lamination core is mounted on the winding support and has a plurality of slots formed therein. One or more coils are inserted within each of the slots. Each coil has at least one end-turn segment protruding from the slot and extending away from the lamination core. The first inner band is located around at least a portion of each of the end-turn segments, and has at least a near end, a distal end disposed opposite the near end, and a thickness. The near end is located proximate the lamination core, and the thickness of at least a portion of the first inner band decreases from at least a point proximate the distal end to at least a point between its distal end and its near end. The first outer band is located around at least a portion of the first inner band, and has at least a near end, a distal end disposed opposite the near end, and a thickness. The first outer band near end is located proximate the first inner band near end, and the thickness of at least a portion of the first outer band increases from at least a point proximate its distal end to at least a point between its distal end and its near end.

In yet another exemplary embodiment, a method of assembling a rotor, includes providing a winding support, and mounting a lamination core on the winding support. One or more coils are wound on the lamination core, and at least one end-turn segment that extends away from the lamination core is formed in each coil. A first inner band is disposed around at least a portion of each of the end-turn segments. The first inner band has at least a near end, a distal end disposed opposite the near end, and a thickness. The near end is located proximate the lamination core, and the thickness of at least a portion of the first inner band decreases from at least a point proximate the distal end to at least a point between its distal end and its near end. A first outer band is disposed around at least a portion of the first inner band. The first outer band has at least a near end, a distal end disposed opposite the near end, and a thickness. The first outer band near end is located proximate the first inner band near end, and the thickness of at least a portion of the first outer band increases from at least a point proximate its distal end to at least a point between its distal end and its near end.

In still another exemplary embodiment, a method of making and installing a coil end-turn segment retention assembly on a rotor assembly having at least a winding support and a plurality of coils, each coil having at least one end-turn segment, wound on the winding support includes the steps of disposing a first inner band around at least a portion of each of the end-turn segments, and disposing a first outer band around at least a portion of the first inner band. The inner band has at least a near end, a distal end disposed opposite the near end, and a thickness. The thickness of at least a portion of the first inner band decreases from at least a point proximate the distal end to at least a point between its distal end and its near end. The first outer band has at least a near end, a distal end disposed opposite the near end, and a thickness. The first outer band near end is located proximate the first inner band near end, and the thickness of at least a portion of the first outer band increases from at least a point proximate its distal end to at least a point between its distal end and its near end.

Other independent features and advantages of the preferred end-turn segment retention system will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it is to be appreciated that the present invention is not limited to use in conjunction with a specific type of electrical machine. Thus, although the present embodiment is, for convenience of explanation, depicted and described as being implemented in a brushless AC (alternating current) generator, it will be appreciated that it can be implemented in other generator designs needed in specific applications.

Figure 1:
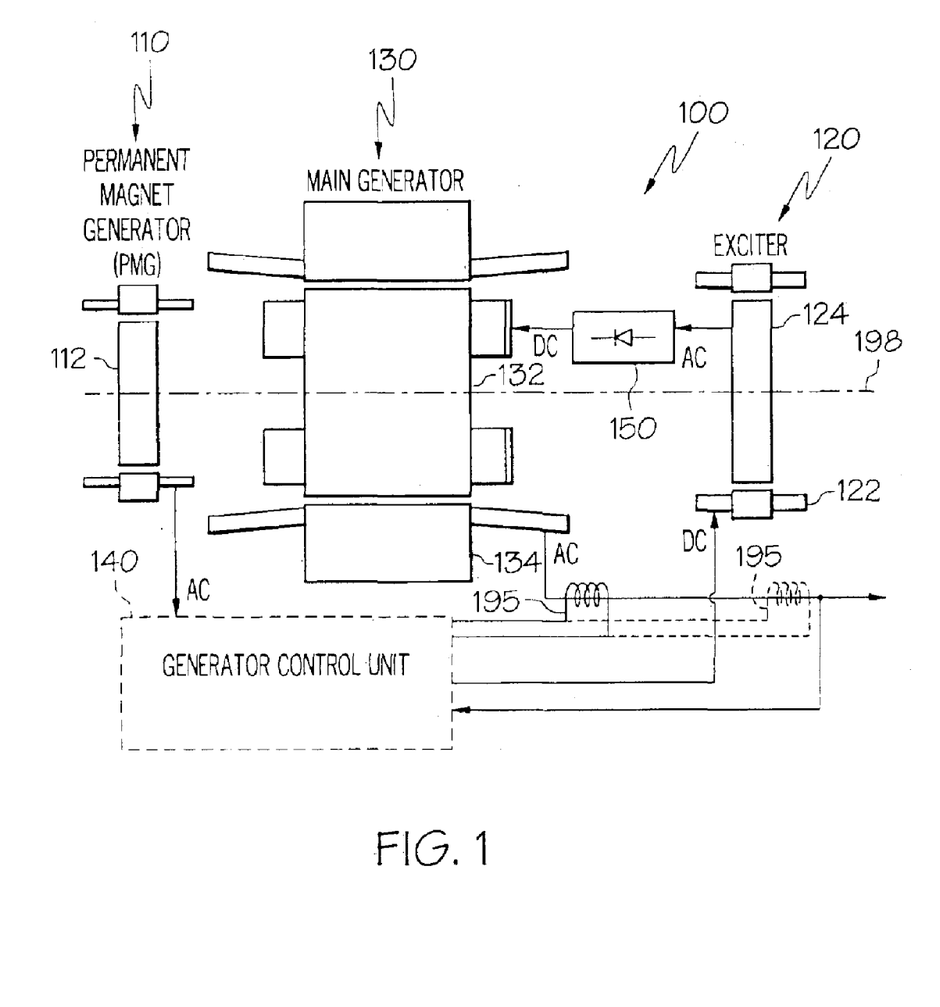
FIG. 1 is a functional schematic block diagram of an exemplary high speed generator system.

Turning now to the description, and with reference first to FIG. 1, a functional schematic block diagram of an exemplary high speed generator system 100 for use with a gas turbine engine such as that in an aircraft is depicted. This exemplary generator system 100, which is commonly known as a brushless AC generator, includes a permanent magnet generator (PMG) 110, an exciter 120, a main generator 130, a generator control unit 140, and one or more rectifier assemblies 150. During operation, a rotor 112 of the PMG 110, a rotor 124 of the exciter 120, and a rotor 132 of the main generator 130 all rotate. The rotational speed of these components may vary. In one embodiment, the rotational speed may be, for example, in the range of about 12,000 to about 24,000 r.p.m., or greater. As the PMG rotor 112 rotates, the PMG 110 generates and supplies AC power to the generator control unit 140, which in turn supplies direct current (DC) power to a stator 122 of the exciter 120. The exciter rotor 124 in turn supplies AC power to the rectifier assemblies 150. The output from the rectifier assemblies 150 is DC power and is supplied to the main generator rotor 132, which in turn outputs AC power from a main generator stator 134.

The generator system 100 is capable of providing output power at a variety of frequencies and over a variety of frequency ranges. Further, typically the output power from the main generator stator 134 is three-phase AC power. The generator control unit 140 can regulate the power output based upon monitoring signals provided to it from monitoring devices 195. In the depicted embodiment, the PMG rotor 112, the exciter rotor 124, and the main generator rotor 132 all rotate along a single axis 198 at the same rotational speed. It will be appreciated, however, that in other embodiments the PMG rotor 112 may rotate along a different axis. Moreover, the relative positioning of the PMG 110, the exciter 120, and the main generator 130 can be modified in different embodiments such that the exciter 120 is physically between the PMG 110 and the main generator 130.

Figure 2:
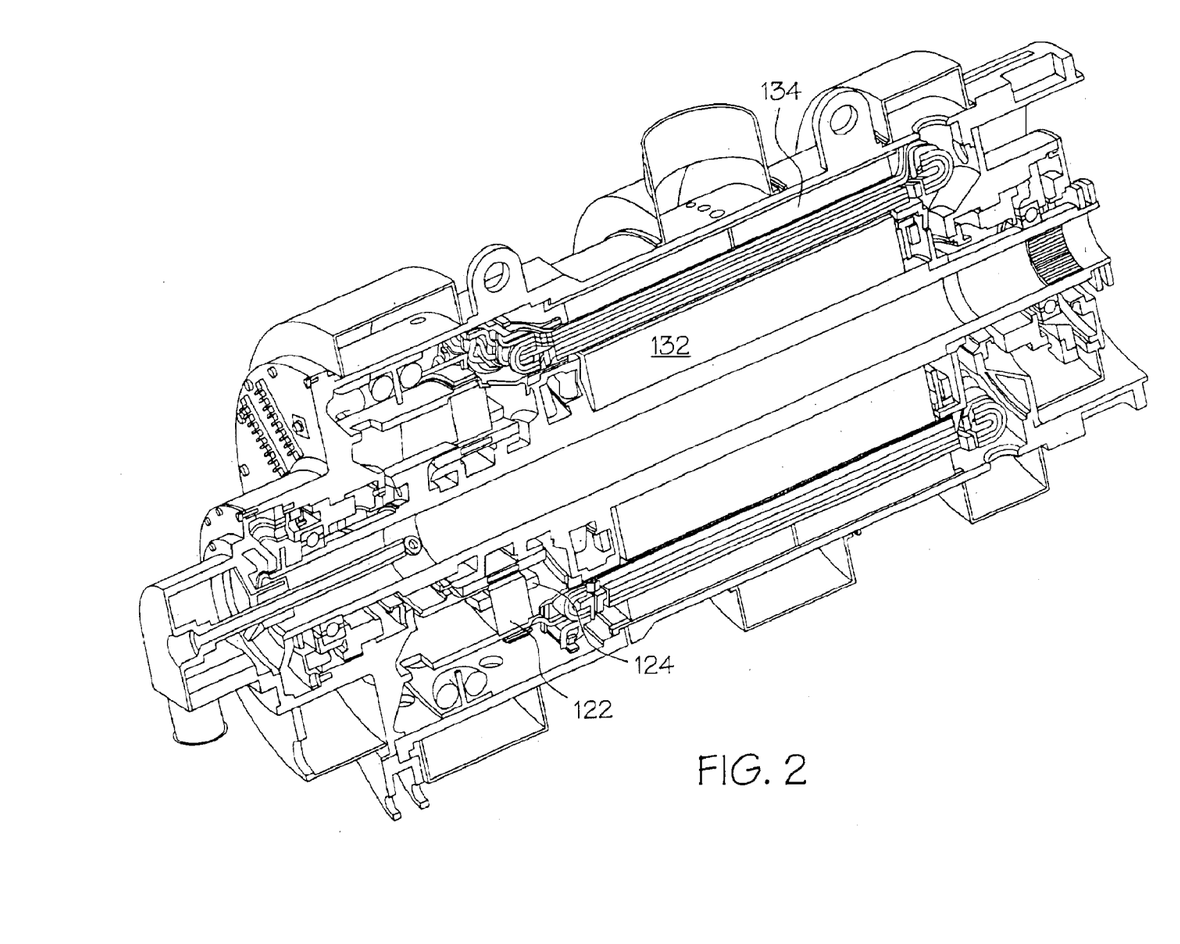
FIG. 2 is a perspective cross section view of a physical embodiment of the generator system depicted in FIG. 1.

A perspective cross section view of an exemplary physical embodiment of at least those portions of the generator system 100 that are mounted within a generator housing 200 is provided in FIG. 2. It is noted that like reference numerals in FIG. 2 refer to like parts depicted in FIG. 1. It is additionally noted that, in the depicted embodiment, at least the exciter rotor 124 and main generator rotor 132 rotate on a common shaft 202. Moreover, for simplicity in illustration, the depicted generator does not include the PMG 110.

With reference now to FIGS. 3–7, the exciter rotor 124, and a preferred system and method of retaining the end turns on the exciter rotor 124, will be described in detail. Before doing so, however, it will be appreciated that the end-turn retention system and method could also be used with other rotors, such as the main generator rotor 132, and is not limited to use with the exciter rotor. Rather, the preferred embodiment is described as being implemented in the exciter rotor 124 for convenience.

Figure 3:
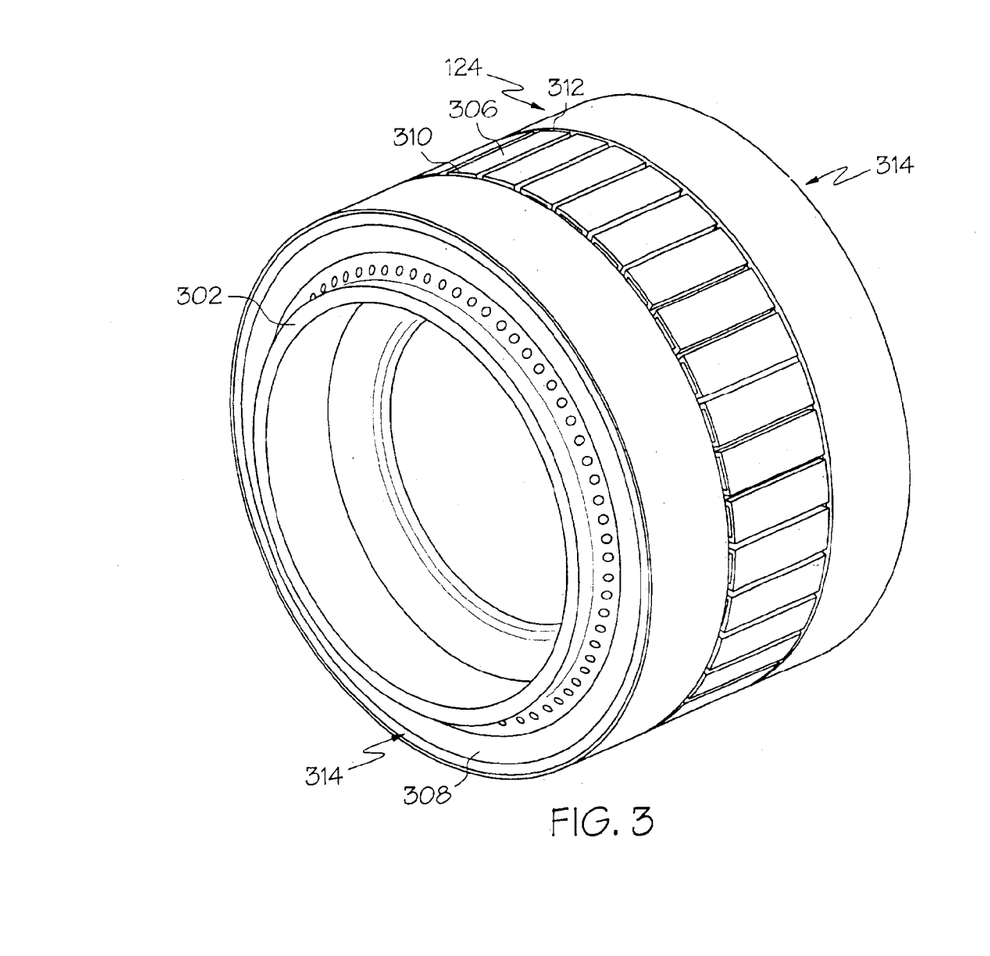
FIGS. 3 and 4 are perspective views of opposite ends of an exciter rotor installed in the generator depicted of FIG. 2, and that incorporates an exemplary embodiment of the present invention.

Turning now to the description, it is seen that the exciter rotor 124 includes a winding support 302, an end-turn support 304 (see FIG. 4), a lamination core 306, and a plurality of coils 308. The winding support 302, as shown most clearly in FIG. 5, includes a lamination support section 502 and a coil support section 504, both of which are substantially cylindrical. The lamination support section 502 includes an inner surface 506 and an outer surface 508. The lamination support section inner surface 506 defines a passage 510 through which the shaft 202 extends, and onto which the winding support 302 is shrunk fit during generator assembly. As will be described in more detail further below, the lamination support section outer surface 508 supports the lamination core 306.

Figure 5:
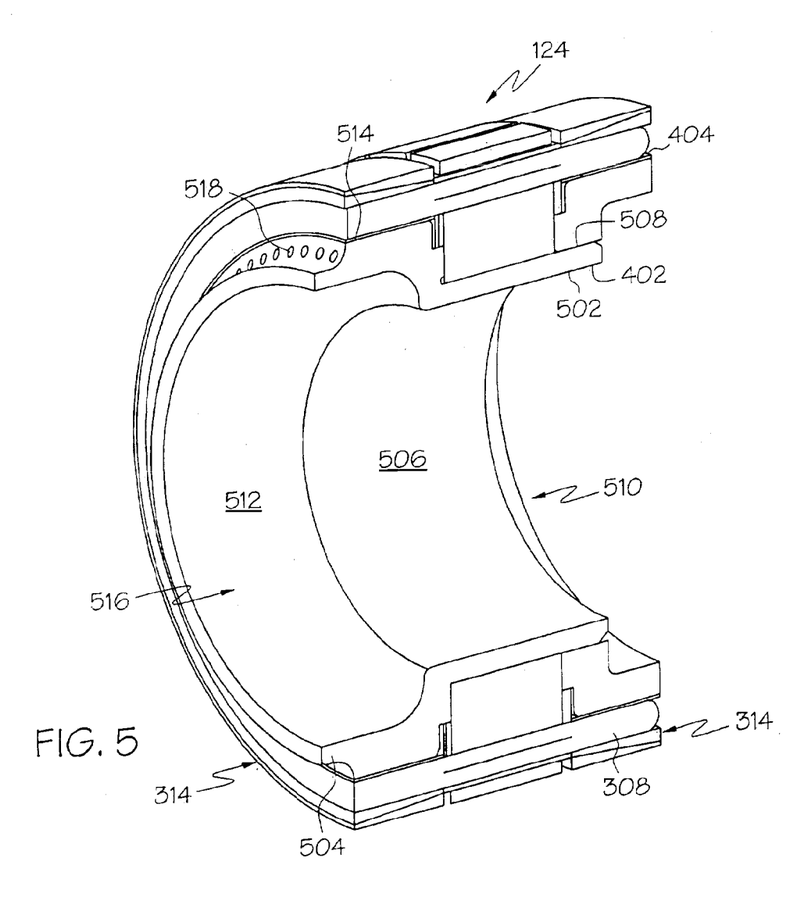
FIG. 5 is a perspective cross section view of the exciter rotor shown in FIGS. 3 and 4.

The coil support section 504, similar to the lamination support section 502, includes an inner surface 512 and an outer surface 514. In the depicted embodiment, the coil support section inner surface 512 also defines a passage 516, which is larger in diameter than the passage 510 defined by the lamination support inner surface 506. Thus, the coil support section 504 surrounds but, in the depicted embodiment, does not contact, the shaft 202. The coil support section outer surface 514, as will be described in more detail below, provides a support surface for one of the ends of the coils 308. The coil support section 504 additionally includes a plurality of openings 518. These openings 518 can be selectively filled with material to achieve proper balancing of the exciter rotor 124.

Figure 4:
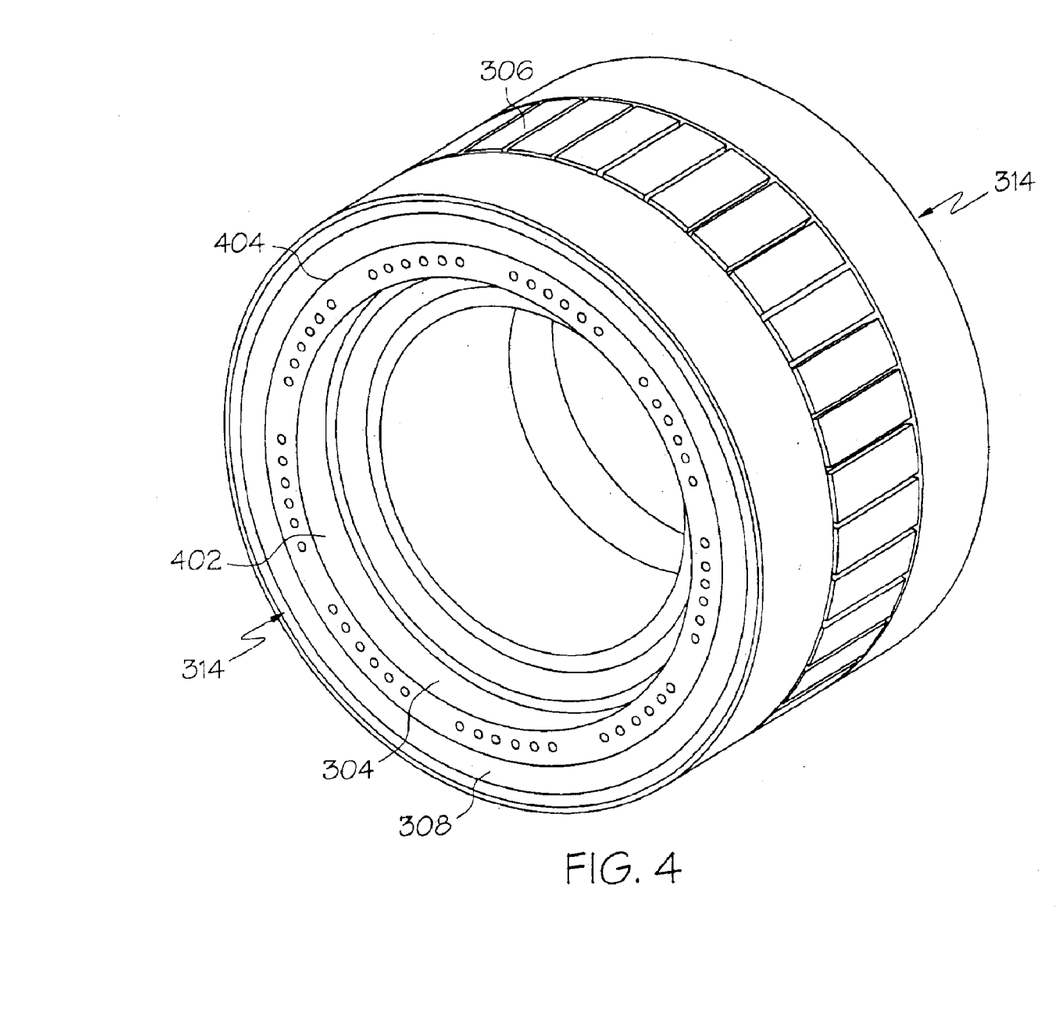

With reference now to FIGS. 4 and 5 in combination, the end-turn support 304 includes an inner surface 402 and an outer surface 404, and is mounted on the first winding support lamination support section 502. In particular, the end-turn support inner surface 402 defines a passage that is at least partially dimensioned to allow the end-turn support 304 to be shrunk fit, or otherwise coupled, onto the lamination support section outer surface 508. The end-turn support outer surface 404 is substantially aligned with the outer surface 514 of the coil support section 504 on winding support 302, and similarly supports provides a support surface for the opposite ends of the coils 308.

The winding support 302 and end-turn support 304 are each manufactured of a high strength material such as, for example, steel, titanium, high strength aluminum, or any one of numerous other high strength materials. Moreover, in the depicted embodiment, the lamination support section 502 and the coil support section 504 on the winding support 302 are integrally formed, though it will be appreciated that each could be formed separately and coupled together using additional structure. Similarly, the end-turn support 304 could be formed as an integral part of the winding support 302.

The lamination core 306, as was noted above, is supported on the outer surface 508 of the lamination support section 502, and includes a first end 310 and a second end 312 (see FIG. 3). The lamination core 306 is formed of a plurality of laminations, and is preferably shrunk fit onto rotor lamination support section 502. As shown most clearly in FIG. 6, two pair (only one pair shown) of insulating rings 602 are also shrunk fit onto the lamination support section 502, one pair each on the lamination core first 310 and second 312 ends. The lamination core 306 and the insulating rings 602 each include a plurality of slots 604. The slots 604 preferably extend longitudinally between the lamination core first 310 and second 312 ends, and are preferably evenly spaced around the lamination core 306. In addition, each of the slots 604 is radially sized to receive two coils 308, one in an inner slot position and one in an outer slot position. It will be appreciated that this slot configuration is merely exemplary of a preferred embodiment and that other slot configurations may be used.

Figure 6:
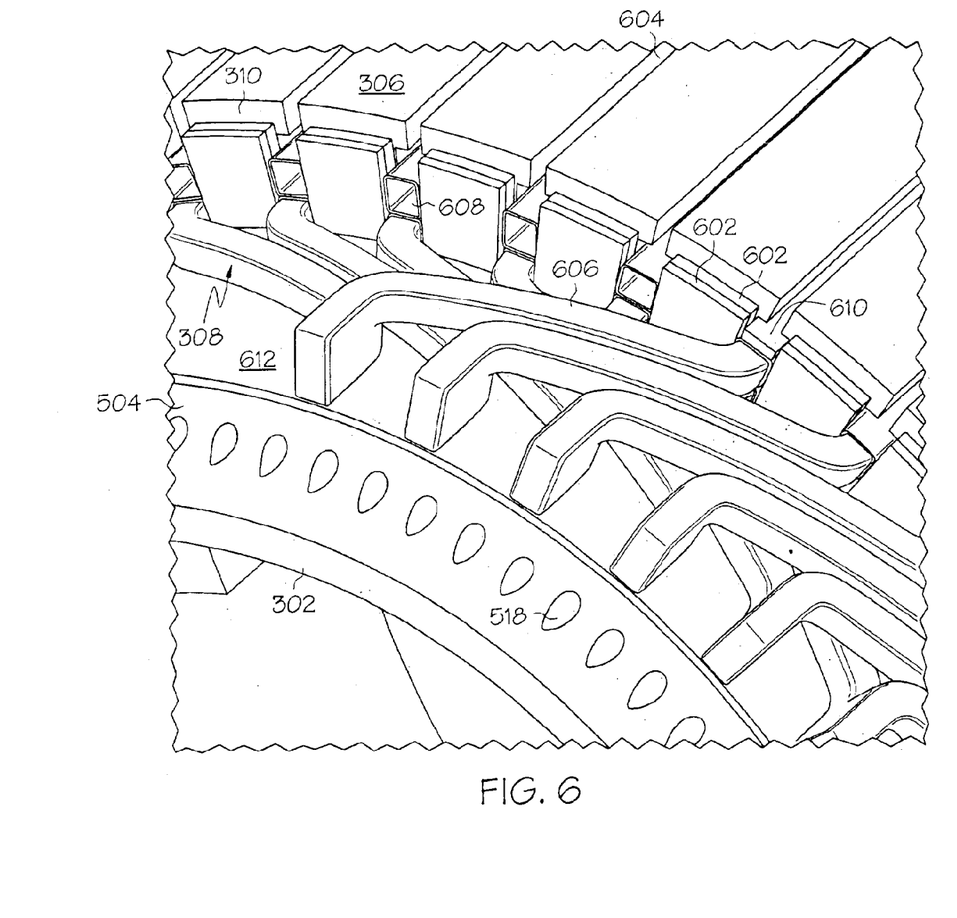
FIG. 6 is a close up perspective view of the exciter rotor shown in FIGS. 3–5 in a partially assembled state.
Figures 7, 8, 9:
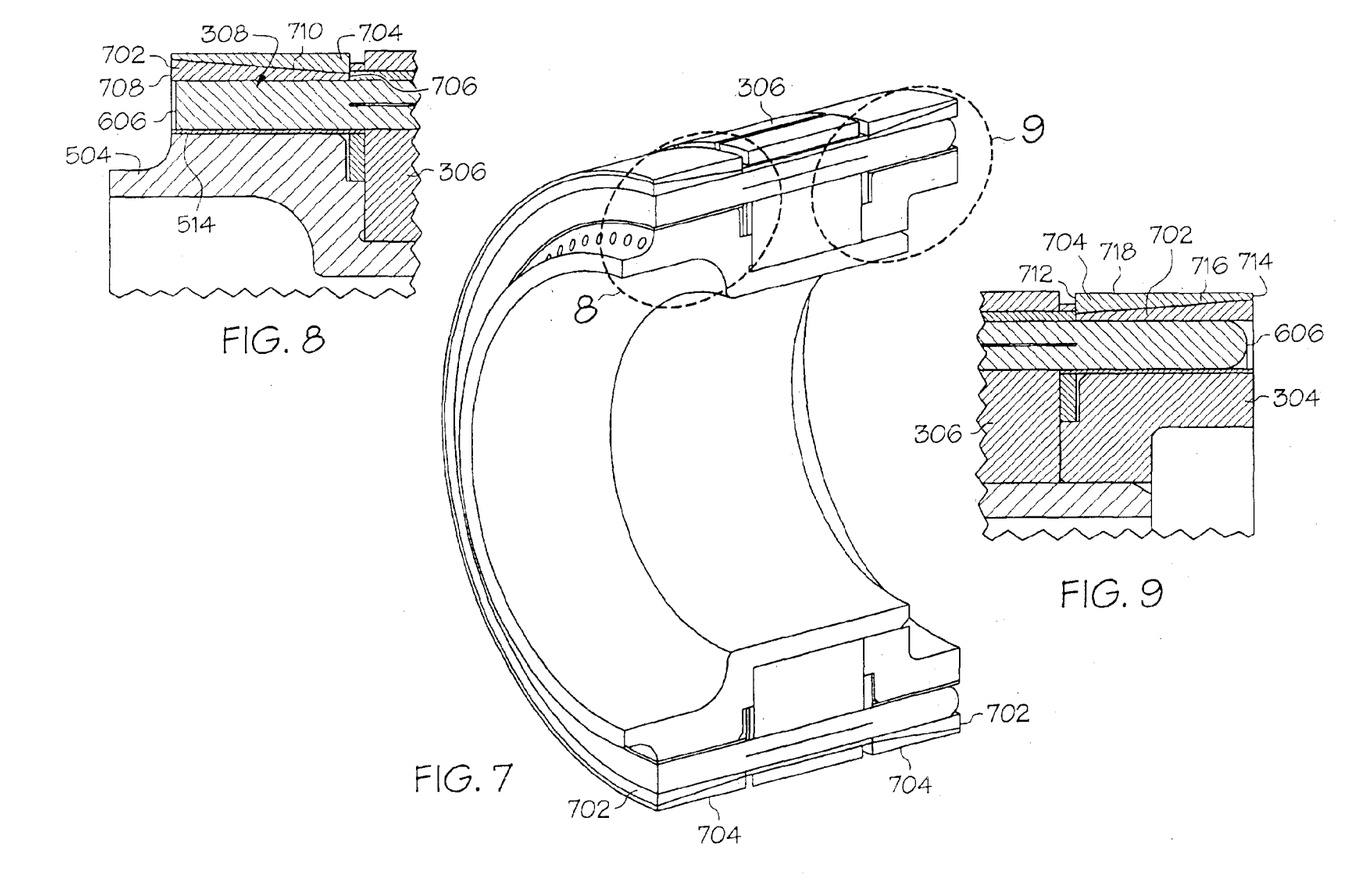
FIG. 7 is a perspective cross section view of the exciter rotor, similar to that of FIG. 5, but with close-up sections to more clearly show an exemplary end-turn retention system of the present invention.
FIGS. 8 and 9 are close-up cross section views of the portions of the exciter rotor shown in FIG. 7 that are encircled with dotted lines.

The coils 308 are made from a conductive metal, such as copper, and as may be seen with continued reference to FIG. 6, are preferably rectangular in cross section. It will be appreciated that these are only exemplary of a preferred embodiment, and that the coils 308 could be constructed of other conductive metals such as, for example, aluminum, zinc, brass, carbon, or iron, and could have other cross sectional shapes, such as round or square. Moreover, each coil 308 could be constructed of a single conductor, or a plurality of conductors. The coils 308 are wound around the lamination core 306 by inserting one or, as shown in FIG. 6 and as was noted above, preferably two segments of each coil 308 into two separate slots 604. The slots 604 that each coil 308 is inserted into are preferably non-adjacent, though it will be appreciated that the present invention is not limited to this scheme. The coils 308 extend the length of each slot 604, and each coil 308 has two non-slot-inserted segments 606 that are external to the slots 604. These non-slot-inserted segments 606 are referred to herein as end-turn segments 606. This is because each coil 308 is bent or twisted; thereby forming an end that provides sufficient spacing between adjacent coils 308. Although only one end of the coils 308 is shown in FIG. 6, it will be appreciated that the other end of the coils 308 may also similarly bent or twisted. The end-turn segments 606 are selectively electrically coupled together, as needed, for either single, or poly-phase operation.

With continued reference to FIG. 6, it is seen that slot insulation 608 is also inserted into the slots 604, and surrounds the segments of each coil 308 inserted therein. The slot insulation 608 may be any one of numerous types of insulating material, but in a preferred embodiment is an insulating tape, such as Nomex®. Preferably, the slot insulation 608 is cut to extend the length of each slot 604, and may be secured within each slot with an adhesive such as, for example, cyanoacrylate. Thereafter, the coils 308 are installed. A slot wedge 610 (only one shown) is additionally disposed within each slot 604, and inhibits radial movement of the coils 308 when the rotor 124 is rotating.

The coil end-turn segments 606 are supported at one end by the coil support section 504 and at the other end by the end-turn support 304. An electrical insulator, such as an insulating tape 612 (see FIG. 6), is placed on at least a portion the coil support section outer surface 514 and the end-turn support outer surface 404. The insulating tape 612 may be any one of numerous types of insulating tapes, but is preferably a fiberglass insulation tape. In a particular preferred embodiment, the fiberglass insulation tape 612 is applied on the outer surfaces 514 and 404, respectively, using a wet lay up process. After the tape is cured, it may then be machined to the desired thickness, and to ensure concentricity with the coil support section outer surface 514.

As was previously noted, the coil end-turn segments 606 are subject to radial loads when the exciter rotor 124 rotates. Hence, with reference now to FIGS. 3–5 and 7–9, it is seen that an end-turn retention assembly 314 is provided for each coil end-turn segment 606. In particular, one end-turn retention assembly 314 is disposed on the winding support coil support section 504 and another retention assembly 314 is disposed on the end-turn support 304. Each end-turn retention assembly 314, as shown most clearly in FIGS. 7–9, includes two bands, an inner band 702 and an outer band 704, and will now be described in more detail.

Each of the inner bands 702 is preferably formed of an electrically insulating material such as, for example, an insulating tape, and includes a first end 706 located proximate the lamination core 306, a second end 708 located opposite the first end 706, and an outer peripheral surface 710. The outer peripheral surface 710 is preferably tapered such that the thickness of the inner band 702 varies between the first 706 and second 708 ends. In a particular preferred embodiment, the thickness of the inner band 702 gradually decreases from the second end 708 to a point proximate the first end 706, in a so-called reverse taper. It will be appreciated that, in a preferred embodiment, the thickness of the entire inner band 702 gradually decreases from the second end 708 to the first end 706; however, the inner band 702 could be alternatively configured. For example, only one or more portions of the inner band 702 could vary in thickness between the first 706 and second 708 ends. Moreover, it will be appreciated that the thickness gradation need not be a straight line, as is shown in FIGS. 5 and 7–9.

In a particular preferred embodiment, each inner band 702 is formed by wrapping the end-turn segments 606 with a fiberglass, resin; or other suitable tape. The wrapping is preferably done as a wet lay up process using a suitable adhesive such as, for example, Hysol 9396®, and with the tape under tension. Once the inner band 702 is cured, any voids between the coil end-turns 606 are then preferably filled with a dielectric epoxy such as, for example, Stycast®, to provide additional inter-coil electrical insulation. The reverse taper is then formed in the inner band outer peripheral surface 710 using, for example, a suitable machining process.

Each of the outer bands 704 is preferably formed of a high strength metal such as, for example, Inconel, and is preferably shrunk fit onto the inner band 702. The outer band 704 includes a first end 712, a second end 714, an inner peripheral surface 716, and an outer peripheral surface 718. The outer band first 712 and second 714 ends are disposed proximate the inner band first 706 and second 708 ends, respectively. The outer band inner peripheral surface 716 is tapered similar to, but in an opposite direction of, the inner band outer peripheral surface 710. In particular, the outer band inner peripheral surface 716 is tapered such that the thickness of the outer band 704 gradually increases from the second end 714 to the first end 712. By forming oppositely configured tapers in the inner 702 and outer 704 bands, the outer bands 704 will remain in place and not migrate axially away from the lamination core 306 during exciter rotor 124 rotation.

The coil end-turn retention system 314 provides additional retention of the coils 308 against the centrifugal loads experienced during exciter rotor rotation, thereby providing a more robust exciter rotor. It will be appreciated that although the present description was provided for an exciter rotor, the coil retention system 314 may also be used to retain the end-turns of the main generator rotor.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A generator, comprising:
    a stator; and
    a rotor rotationally mounted at least partially within the stator, the rotor including:
        a winding support,
        a lamination core mounted on the winding support and having a plurality of slots formed therein,
        one or more coils inserted within each of the slots, each coil having at least one end-turn segment protruding from the slot and extending away from the lamination core,
        a first inner band located around at least a portion of each of the end-turn segments, the inner band having at least a near end, a distal end disposed opposite the near end, and a thickness, the near end located proximate the lamination core, and the thickness of at least a portion of the first inner band decreasing from at least a point proximate the distal end to at least a point between its distal end and its near end, and
        a first outer band located around at least a portion of the first inner band, the first outer band having at least a near end, a distal end disposed opposite the near end, and a thickness, the first outer band near end located proximate the first inner band near end, and the thickness of at least a portion of the first outer band increasing from at least a point proximate its distal end to at least a point between its distal end and its near end.

2. The generator of claim 1, wherein:
    the first inner band comprises a dielectric tape; and
    the first outer band comprises a metal.

3. The generator of claim 1, further comprising:
    a dielectric material disposed between at least a portion of each of the coil end-turn segments.

4. The generator of claim 1, wherein the winding support includes:
    a lamination support section on which the lamination core is mounted; and
    an end-turn support section, the end-turn support section having a support surface positioned proximate the coil end-turn segments and disposed substantially opposite the inner band.

5. The generator of claim 4, further comprising:
    a dielectric material disposed between the end-turn support section support surface and the coil end-turn segments.

6. The generator of claim 4, wherein:
    the lamination core includes a first end and a second end;
    each of the lamination slots extends between the lamination core first and second ends;
    each coil includes one or more end-turn segments that protrude from one or more of the lamination slots proximate the lamination core first or second end and extend away from the lamination core;
    the first inner band is located around the end-turn segments that protrude from the lamination slots proximate the lamination core first end; and
    the rotor further comprises:
        a coil support coupled to the winding support and disposed substantially opposite the winding support end-turn support section, the coil support having a support surface substantially aligned with the end-turn support section support surface,
        a second inner band located around the end-turn segments that extend from lamination slots proximate the lamination core second end, the second inner band having at least a near end, a distal end disposed opposite the near end, and a thickness, the near end located proximate the lamination core, and the thickness of at least a portion of the second inner band decreasing from at least a point proximate the distal end to at least a point between its distal end and its near end, and
        a second outer band located around at least a portion of the second inner band, the second outer band having at least a near end, a distal end disposed opposite the near end, and a thickness, the second outer band near end located proximate the second inner band near end, and the thickness of at least a portion of the second outer band increasing from at least a point proximate its distal end to at least a point between its distal end and its near end.

7. The generator of claim 6, wherein:

the first and second inner bands each comprise a dielectric tape; and the first and second outer bands each comprise a metal.

8. The generator of claim 6, further comprising:

a dielectric material disposed between at least a portion of each of the coil end-turn segments.

9. The generator of claim 1, wherein:

the generator is a brushless AC generator having a main generator assembly and an exciter generator assembly; and the rotor is part of the main generator assembly.

10. The generator of claim 1, wherein:

the generator is a brushless AC generator having a main generator assembly and an exciter generator assembly; and the rotor is part of the exciter generator assembly.

11. The rotor of claim 1, further comprising:

a dielectric material disposed between at least a portion of each of the coil end-turn segments.

12. A rotor assembly for a generator, comprising:

a winding support;

a lamination core mounted on the winding support and having a plurality of slots formed therein;

one or more coils inserted within each of the slots, each coil having at least one end-turn segment protruding from the slot and extending away from the lamination core;

a first inner band located around at least a portion of each of the end-turn segments, the inner band having at least a near end, a distal end disposed opposite the near end, and a thickness, the near end located proximate the lamination core, and the thickness of at least a portion of the first inner band decreasing from at least a point proximate the distal end to at least a point between its distal end and its near end; and a first outer band located around at least a portion of the first inner band, the first outer band having at least a near end, a distal end disposed opposite the near end, and a thickness, the first outer band near end located proximate the first inner band near end, and the thickness of at least a portion of the first outer band increasing from at least a point proximate its distal end to at least a point between its distal end and its near end.

13. The rotor of claim 11, wherein:

the first inner band comprises a dielectric tape; and the first outer band comprises a metal.

14. The rotor of claim 11, wherein the winding support includes:

a lamination support section on which the lamination core is mounted; and an end-turn support section, the end-turn support section having a support surface positioned proximate the coil end-turn segments and disposed substantially opposite the inner band.

15. The rotor of claim 14, further comprising:

a dielectric material disposed between the end-turn support section support surface and the coil end-turn segments.

16. The rotor of claim 14, wherein:

the lamination core includes a first end and a second end;

each of the lamination slots extends between the lamination core first and second ends;

each coil includes one or more end-turn segments that protrude from one or more of the lamination slots proximate the lamination core first or second end and extend away from the lamination core;

the first inner band is located around the end-turn segments that protrude from the lamination slots proximate the lamination core first end; and the rotor further comprises:

a coil support coupled to the winding support and disposed substantially opposite the winding support end-turn support section, the coil support having a support surface substantially aligned with the end-turn support section support surface, a second inner band located around the end-turn segments that extend from lamination slots proximate the lamination core second end, the second inner band having at least a near end, a distal end disposed opposite the near end, and a thickness, the near end located proximate the lamination core, and the thickness of at least a portion of the second inner band decreasing from at least a point proximate the distal end to at least a point between its distal end and its near end, and a second outer band located around at least a portion of the second inner band, the second outer band having at least a near end, a distal end disposed opposite the near end, and a thickness, the second outer band near end located proximate the second inner band near end, and the thickness of at least a portion of the second outer band increasing from at least a point proximate its distal end to at least a point between its distal end and its near end.

17. The rotor of claim 16, wherein:

the first and second inner bands each comprise a dielectric tape; and the first and second outer bands each comprise a metal.

18. The rotor of claim 16, further comprising:

a dielectric material disposed between at least a portion of each of the coil end-turn segments.

19. A method of assembling a rotor, comprising:

providing a winding support;

mounting a lamination core on the winding support;

winding one or more coils on the lamination core;

forming at least one end-turn segment in each coil, each end-turn segment extending away from the lamination core;

disposing a first inner band around at least a portion of each of the end-turn segments, the inner band having at least a near end, a distal end disposed opposite the near end, and a thickness, the near end located proximate the lamination core, and the thickness of at least a portion of the first inner band decreasing from at least a point proximate the distal end to at least a point between its distal end and its near end; and disposing a first outer band around at least a portion of the first inner band, the first outer band having at least a near end, a distal end disposed opposite the near end, and a thickness, the first outer band near end located proximate the first inner band near end, and the thickness of at least a portion of the first outer band increasing from at least a point proximate its distal end to at least a point between its distal end and its near end.

20. The method of claim 19, wherein the step of disposing the first inner band comprises the steps of:

wrapping a dielectric material around at least a portion of the end-turn segments, the dielectric material having the inner band near end, the inner band distal end, a thickness, and an outer peripheral surface; and machining the outer peripheral surface of the dielectric material so at least a portion of the dielectric material thickness decreases from at least a point proximate the distal end to at least a point between its distal end and its near end.

21. The method of claim 20, wherein the dielectric material is wrapped under tension.

22. The method of claim 20, wherein:

the dielectric material is wrapped as a wet lay up process using an adhesive; and the outer peripheral surface is machined after the dielectric material cures.

23. The method of claim 19, wherein the step of disposing the first outer band comprises the step of:

shrink fitting the outer band over at least a portion of the inner band.

24. In a rotor assembly having at least a winding support and a plurality of coils wound on the winding support, each coil having at least one end-turn segment, a method of making and installing a coil end-turn segment retention assembly on the rotor, the method comprising the steps of:

disposing a first inner band around at least a portion of each of the end-turn segments, the inner band having at least a near end, a distal end disposed opposite the near end and a thickness, the thickness of at least a portion of the first inner band decreasing from at least a point proximate the distal end to at least a point between its distal end and its near end; and disposing a first outer band around at least a portion of the first inner band, the first outer band having at least a near end, a distal end disposed opposite the near end, and a thickness, the first outer band near end located proximate the first inner band near end, and the thickness of at least a portion of the first outer band increasing from at least a point proximate its distal end to at least a point between its distal end and its near end.

25. The method of claim 24, wherein the step of disposing the first inner band comprises the steps of:

wrapping a dielectric material around at least a portion of the end-turn segments, the dielectric material having the inner band near end, the inner band distal end, a thickness, and an outer peripheral surface; and machining the outer peripheral surface of the dielectric material so at least a portion of the dielectric material thickness decreases from at least a point proximate the distal end to at least a point between its distal end and its near end.

26. The method of claim 25, wherein the dielectric material is wrapped under tension.

27. The method of claim 25, wherein:

the dielectric material is wrapped as a wet lay up process using an adhesive; and the outer peripheral surface is machined after the dielectric material cures.

28. The method of claim 25, wherein the step of disposing the first outer band comprises the step of:

shrink fitting the outer band over at least a portion of the inner band.

* * * * *